(12) United States Patent
Brantner

(10) Patent No.: US 12,543,709 B2
(45) Date of Patent: Feb. 10, 2026

(54) HIGH PRODUCTION HONEY BEEHIVES

(71) Applicant: Daniel Brantner, Plano, TX (US)

(72) Inventor: Daniel Brantner, Plano, TX (US)

( * ) Notice: Subject to any disclaimer, the term of this patent is extended or adjusted under 35 U.S.C. 154(b) by 104 days.

(21) Appl. No.: 18/197,102

(22) Filed: May 14, 2023

(65) Prior Publication Data

US 2023/0363358 A1    Nov. 16, 2023

Related U.S. Application Data

(60) Provisional application No. 63/342,076, filed on May 14, 2022.

(51) Int. Cl.
*A01K 47/02* (2006.01)

(52) U.S. Cl.
CPC .................................. *A01K 47/02* (2013.01)

(58) Field of Classification Search
CPC ......... A01K 47/02; A01K 47/06; A01K 47/00
See application file for complete search history.

(56) References Cited

U.S. PATENT DOCUMENTS

| | | | | |
|---|---|---|---|---|
| 9,300 A | * | 10/1852 | Langstroth | A01K 47/06 449/16 |
| 84,415 A | * | 11/1868 | Cuplin | A01K 47/00 449/40 |
| 91,203 A | * | 6/1869 | Berix | A01K 47/06 449/22 |
| 95,100 A | * | 9/1869 | Flick | A01K 47/06 449/22 |
| 95,436 A | * | 10/1869 | Critchfield | A01K 47/00 449/41 |
| 330,783 A | * | 11/1885 | Groff | A01K 47/00 449/38 |
| 387,217 A | * | 8/1888 | Doyal | A01K 47/02 449/35 |
| 468,783 A | * | 2/1892 | Brewer | A01K 47/00 449/32 |
| 499,490 A | * | 6/1893 | Wismer | A01K 47/06 449/25 |

(Continued)

FOREIGN PATENT DOCUMENTS

| | | | | | |
|---|---|---|---|---|---|
| CA | 1131506 A | * | 9/1982 | | A01K 47/06 |
| CN | 1568142 A | * | 1/2005 | | A01K 47/06 |

(Continued)

OTHER PUBLICATIONS

Merged translation of KR_200351851 (Year: 2004).*

(Continued)

*Primary Examiner* — Morgan T Jordan
(74) *Attorney, Agent, or Firm* — Thrasher Associates, LLC

(57) ABSTRACT

Embodiments herein disclose a beehive system for high honey production. The beehive system includes a first lid slot assembly arranged between a first brood box and a second brood box. The first brood box and the second brood box are arranged linearly and parallel to each other. A bottom side of the first brood box and a bottom side of the second brood box are located over a bottom board in a same plane. A first migratory top cover is placed on top of the first brood box, and a second migratory top cover is placed on top of the second brood box to cover the first brood box and the second brood box, respectively.

22 Claims, 14 Drawing Sheets

(56) References Cited

U.S. PATENT DOCUMENTS

| | | | | |
|---|---|---|---|---|
| 509,438 A * | 11/1893 | Langdon | ............... | A01K 47/00 449/25 |
| 808,144 A * | 12/1905 | Dempsey | ............... | A01K 47/06 449/24 |
| 993,060 A * | 5/1911 | Hand | ............... | A01K 47/00 449/25 |
| 1,203,675 A * | 11/1916 | Wood | ............... | A01K 47/00 449/37 |
| 1,211,145 A * | 1/1917 | Hains | ............... | A01K 47/06 449/24 |
| 2,103,066 A * | 12/1937 | Engelbrektsson | ..... | A01K 47/00 449/45 |
| 3,995,338 A * | 12/1976 | Kauffeld | ............... | A01K 47/06 449/19 |
| 4,135,265 A * | 1/1979 | Van de Kerkof | ...... | A01K 47/00 449/9 |
| 4,158,900 A * | 6/1979 | Musgrove | ............... | A01K 47/06 449/23 |
| 4,257,133 A * | 3/1981 | Steinrucken | ........... | A01K 47/06 449/12 |
| 4,367,563 A * | 1/1983 | Ferguson | ............... | A01K 47/06 449/19 |
| 4,402,099 A * | 9/1983 | Platt, Jr. | ............... | A01K 47/00 449/2 |
| 4,455,699 A * | 6/1984 | Brown | ............... | A01K 47/06 449/21 |
| 4,459,715 A * | 7/1984 | Adams, IV | ............ | A01K 47/00 449/32 |
| 4,483,031 A * | 11/1984 | Shaparew | ............... | A01K 47/06 449/14 |
| 10,729,109 B1 * | 8/2020 | Wolfe, II | ............... | A01K 49/00 |
| 2014/0127969 A1 * | 5/2014 | Mullins | ............... | A01K 49/00 449/7 |
| 2014/0134921 A1 * | 5/2014 | Dron | ............... | A01K 47/00 449/32 |
| 2016/0212976 A1 * | 7/2016 | Bulanyy | ............... | A01K 47/06 |
| 2018/0295815 A1 * | 10/2018 | Schulte | ............... | A01K 47/06 |

FOREIGN PATENT DOCUMENTS

| | | | | |
|---|---|---|---|---|
| CN | 106614103 A | * | 5/2017 | |
| CN | 111466318 B | * | 7/2022 | ............ A01K 47/02 |
| DE | 202016006529 U1 | * | 12/2016 | |
| DE | 102016012619 A1 | * | 4/2018 | ............ A01K 47/00 |
| FR | 2595909 A1 | * | 9/1987 | |
| GB | 543588 A | * | 3/1942 | |
| GB | 2586263 A | * | 2/2021 | ............ A01K 47/06 |
| KR | 200351851 Y1 | * | 5/2004 | |
| KR | 20090009494 U | * | 9/2009 | |
| KR | 20110024884 A | * | 3/2011 | |
| WO | WO-2010098853 A1 | * | 9/2010 | ............ A01K 47/06 |

OTHER PUBLICATIONS

Merged translation of CN_1568142 (Year: 2005).*
Merged translation of KR_20090009494 (Year: 2009).*
Merged translation of KR_20110024884 (Year: 2011).*
Merged translation of DE_202016006529 (Year: 2016).*
Merged translation of CN_106614103 (Year: 2017).*
Merged translation of DE_102016012619 (Year: 2018).*
Merged translation of CN_111466318 (Year: 2022).*

* cited by examiner

HIGH PRODUCTION HONEY BEEHIVES

CLAIM OF PRIORITY, IDENTIFICATION OF RELATED APPLICATIONS

This Non-Provisional Patent application claims priority from U.S. Provisional Patent Application No. 63/342,076 filed on May 14, 2022 entitled Migratory Multiple-Queen Horizontal Honey Bee Hive Base, to common inventor Daniel Casey Brantner.

TECHNICAL FIELD

The invention generally relates to honey production and harvesting.

Problem Statement and History Interpretation Considerations

This section describes technical field in detail and discusses problems encountered in the technical field. Therefore, statements in the section are not to be construed as prior art.

Discussion of History of the Problem

Mankind began harnessing bees for honey production long before recorded history. The most ancient breweries—which produced a product called honey beer—often incorporated honey production within the brewery. Indeed, when explorers first encountered tribes such as the Maasai of Africa in the 1800s, these tribes which claim 10,000 years of oral history were discovered to practice this method of beer production.

In the West, honey production and bee keeping (or 'bee husbandry") evolved into a science in the 1800s, and has long been recognizable for the boxed-hive system that has been 'state of the art' for around 100 years. Commonly, hives comprise boxes specialized for worker and queen residence, and others used for honey production.

For decades, honey producers have speculated about hive designs that could lead to more robust honey production, to wit:

US Publication No. 2014/0,127,969 discloses a man-made beehive that allows a bees to store honey, wherein the man-made beehive includes a natural cedar wood general rectangular shape two queen hive, a plurality of brood boxes removably held within the two-queen hive, the brood boxes house a plurality of eggs, larvae and pupae from the bees utilized by the man-made beehive and a plurality of screened bottom boards positioned in the bottom portion of the two queen hive. The man-made beehive also includes a telescoping cover positioned on the top portion of the two-queen hive to protect the man-made beehive and a queen excluder that is positioned between a pair of the brood boxes.

U.S. Pat. No. 4,241,467 discloses a method and system for introducing a second queen into an established colony of honey bees for additional build-up of the worker bee force prior to the early honey flow, and for the eventual replacement of the resident queen. The established brood is divided into two divisions and placed in separate brood chambers positioned side by side with the resident queen in one division and an introduced queen in the other division. A hive chamber containing drawn comb or comb foundation is placed over each of the chambers containing brood to provide space for brood expansion. Worker bees can move vertically and diagonally among the hive chambers. The two queen bees can move either vertically or diagonally between two hive chambers in a manner which prevents direct contact between them during the brood build-up.

U.S. Pat. No. 10,729,109 discloses a two-queen beehive including a base having a first compartment for retaining a first queen, a second compartment for retaining a second queen, and a divider dividing the first compartment from the second compartment. A first roof extends over a portion of the first compartment, such that a remaining portion of the first compartment proximate to the divider is open. A second roof extends over a portion of the second compartment, such that a remaining portion of the second compartment proximate to the divider is open. A distance encompassing the remaining portion of the first compartment, the divider, and the remaining portion of the second compartment is sized to receive and retain a super mounted thereon.

In order to maximize pollination services and honey production, commercial beekeepers must be able to transport their honey bee hive colonies across the country on pallets that are loaded onto trucks or flatbed trailers. However, none of these prior art references have proposed designs that are deployable in actual honey production and are easy to transport. Either their designs are limited in their environmental resiliency, in their economic feasibility, and/or their in-use production. Accordingly, there exists the need for systems and devices that achieve high honey production, are sufficiently environmentally resilient to last through a production season, are economically viable, are easy to transport and provide a simplified method to manage the various stages of the honey beehive over its annual cycle by preventing bee colony losses. The present invention provides such beehive systems and honey beehive management system.

SUMMARY

The above objective is solved by a high production honey beehive system comprising the features of the independent claims. Advantageous embodiments and applications of the present invention are defined in the dependent claims.

The beehive system includes a first lid slot assembly arranged between a first brood box and a second brood box. The first lid slot assembly includes a first lid latch assembly for latching the first lid slot assembly between the first brood box and the second brood box. The first brood box and the second brood box are arranged parallel to each other, where a bottom side of the first brood box and a bottom side of the second brood box are located over a bottom board in a same plane. The bottom side of the first brood box and the bottom side of the second brood box are located over the bottom board using one or more supporting elements. The first brood box is covered by a first migratory top cover and the second brood box is covered by a second migratory top cover.

In an embodiment of the present invention, a third brood box is positioned over and in vertical alignment with the first brood box. The third brood box includes a first handling means to assist a user to carry the third brood box and is covered by the first migratory top cover. A fourth brood box is positioned over and in vertical alignment with the second brood box. The fourth brood box includes a second handling means to assist the user to carry the fourth brood box and is covered by the second migratory top cover.

In another embodiment of the present invention, the beehive system includes a first lid slot assembly arranged between a first brood box and a second brood box and a second lid slot assembly arranged between the second brood box and a third brood box. The first brood box, the second brood box and the third brood box are arranged parallel to each other. A bottom side of the first brood box, a bottom side of the second brood box and a bottom side of the third brood box are located over a bottom board in a same plane. The bottom side of the first brood box, the bottom side of the second brood box, and the bottom side of the third brood box are located over the bottom board using at least one supporting element. The at least one supporting element is placed between the bottom board and at least one of the bottom side of the first brood box, the bottom side of the second brood box and the bottom side of the third brood box.

In another embodiment of the present invention, a fourth brood box positioned over and in vertical alignment with the first brood box. A fifth brood box is positioned over and in vertical alignment with the second brood box and a sixth brood box positioned over and in vertical alignment with a third brood box. A first migratory top cover covers the fourth brood box, a second migratory top cover covers the fifth brood box, and a third migratory top cover covers the sixth brood box. The fourth brood box includes a first handling means to assist a user to carry the fourth brood box. The fifth brood box includes a second handling means to assist the user to carry the fifth brood box. The sixth brood box includes a third handling means to assist the user to carry the sixth brood box.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT INTERPRETATION CONSIDERATIONS

Figure 1:
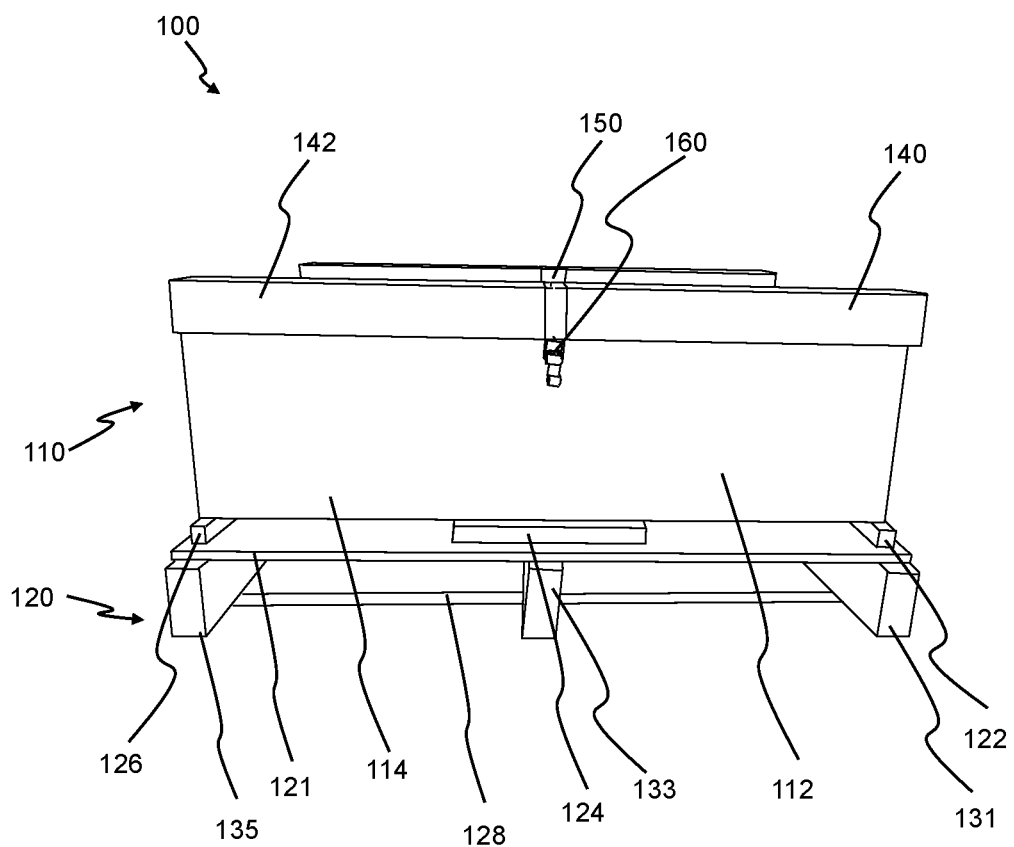
FIG. 1 illustrates a front perspective view of a beehive system.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The present invention discloses honey production systems and devices comprising sub-systems and elements shown and described. The honey production systems and devices are migratory multiple-queen horizontal honey bee hive systems. Advantageously, the present invention assists in achieving high honey production using the honey production systems and devices which are sufficiently environmentally resilient to last through a production season and are economically viable and simplified hive management. The beehive system disclosed herein is easy and safe to transport.

TABLE

LIST OF REFERENCE NUMERALS

| Our Reference Numeral | Element Name |
| --- | --- |
| 100, 200, 900, 1000 | Beehive system |
| 110, 910 | Brood box top portion |
| 120, 920 | Brood box bottom portion (pallet) |
| 112, 912 | First brood box |
| 114, 914 | Second brood box |
| 121, 921 | Upper bottom boards |
| 122, 124, 126, 922, 924, 925, 926 | Supporting elements |
| 128 | Lower bottom board |
| 131, 133, 135 | Lower Supporting elements |
| 140, 940 | First migratory top cover |
| 142, 941 | Second migratory top cover |
| 150, 950 | First lid slot assembly |
| 160, 960 | First lid latch assembly |
| 170, 1170, 1180, 1190 | Predefined gap (Bee space gap) |
| 210, 913 | Third brood box |
| 220, 1010 | Fourth brood box |
| 212, 222, 1012, 1022, 1032 | Handling means |
| 300 | Top perspective view of the beehive system |
| 312, 314, 1112, 1114, 1115 | Frame interior arrangement |
| 320-339, 1120-1129, 1130-1139, 1140-1149 | A plurality of second type of beehive frames |
| 341, 342, 1171, 1172, 1173, 1174 | A plurality of first type of beehive frames |
| 350, 1152, 1154 | Removable queen excluder panel brood box divider |
| 352, 1162 | First lid hinge |
| 360 | Receiving slot |
| 400 | Inner details of the beehive system |
| 421, 431 | Honeycomb structured layer (beehive frame foundation element) |
| 450 | Removable solid panel brood box divider |
| 455 | A plurality of recesses (ie frame supports) |
| 460 | Inner (bottom) surface of the first lid slot assembly |
| 465 | Receiving slot |
| 470, 472, 652, 654, 656, 658, 1252, 1253, 1254, 1256, 1257, 1258 | Frame rest |
| 485 | Vertical slot |
| 490 | Horizontal slot |
| 500 | Inner details of the beehive system |
| 600 | Side perspective view of the beehive system |
| 620, 1220, 1230 | Support |
| 621, 622, 1221, 1222, 1231, 1232 | U shaped pallet clip |
| 700 | Front view of bottom board |
| 720, 1420, 1430 | Groove |
| 800 | Front view of bottom board |
| 860, 862, 1472, 1474, 1475, 1477, 1275, 1276 | W shaped pallet clips |
| 928 | Additional bottom board |
| 931, 933, 934, 935 | Additional supporting elements |
| 952 | Second lid slot assembly |
| 942 | Third migratory top cover |
| 962 | Second lid latch assembly |
| 1015 | Fifth brood box |
| 1020 | Sixth brood box |
| 1164 | Second lid hinge |
| 1100 | Top perspective view of the beehive system |
| 1200 | Side perspective view of the beehive system |
| 1300 | Front view of bottom board |
| 1400 | Front view of bottom board |

Figure 2:
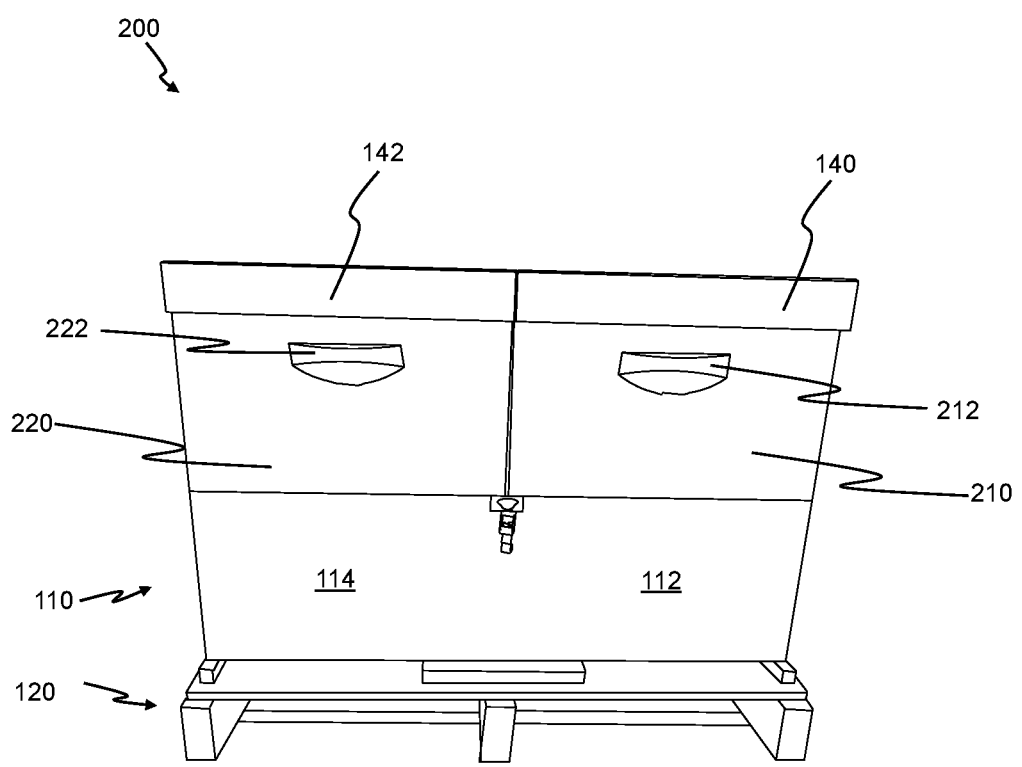
FIG. 2 illustrates a front perspective view of the beehive system depicting an alternative arrangement.
Figure 3:
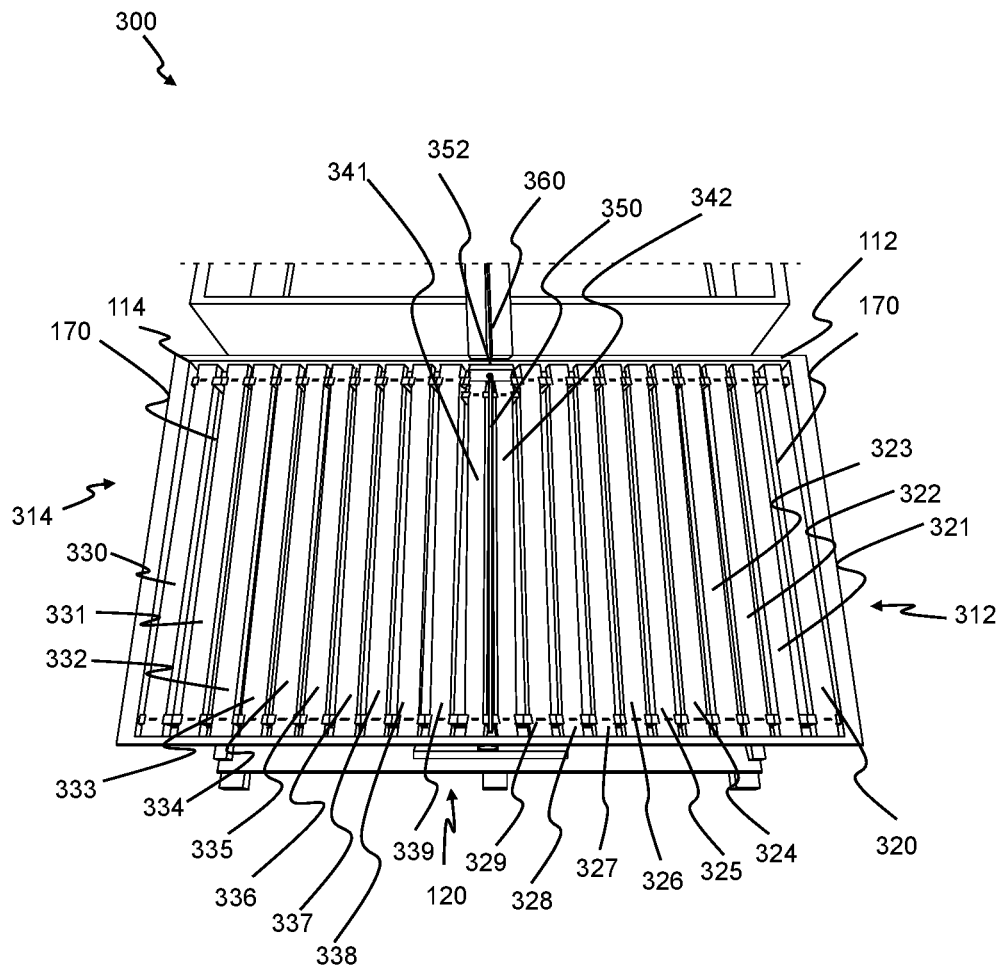
FIG. 3 is a top perspective view of the beehive system with a plurality of first type of beehive frames and a plurality of second type of beehive frames, where a first lid slot assembly is in an open position.
Figure 4:
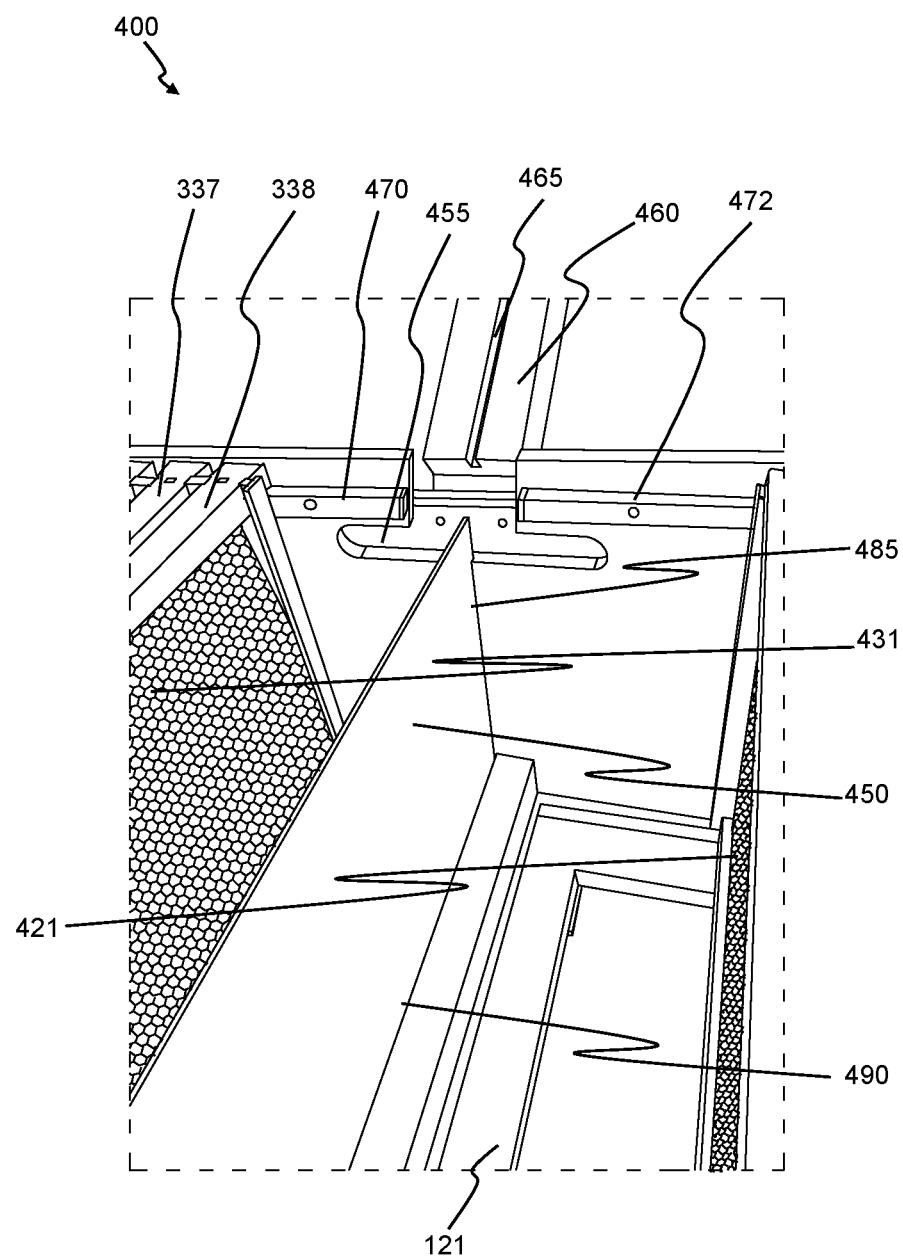
FIG. 4 illustrates inner details of the beehive system having a removable solid panel brood box divider installed therein.
Figure 5:
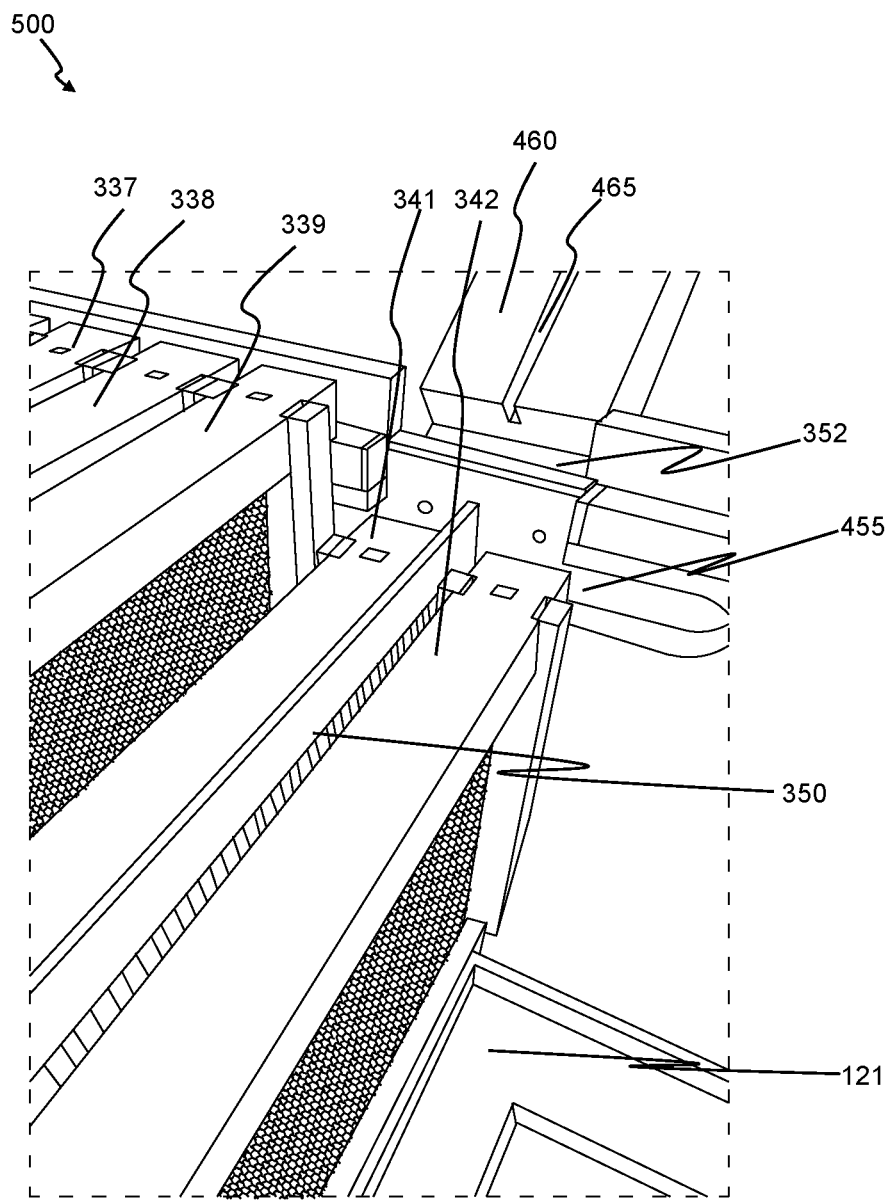
FIG. 5 illustrates the inner details of the beehive system having a removable queen excluder panel brood box divider installed therein.
Figure 6:
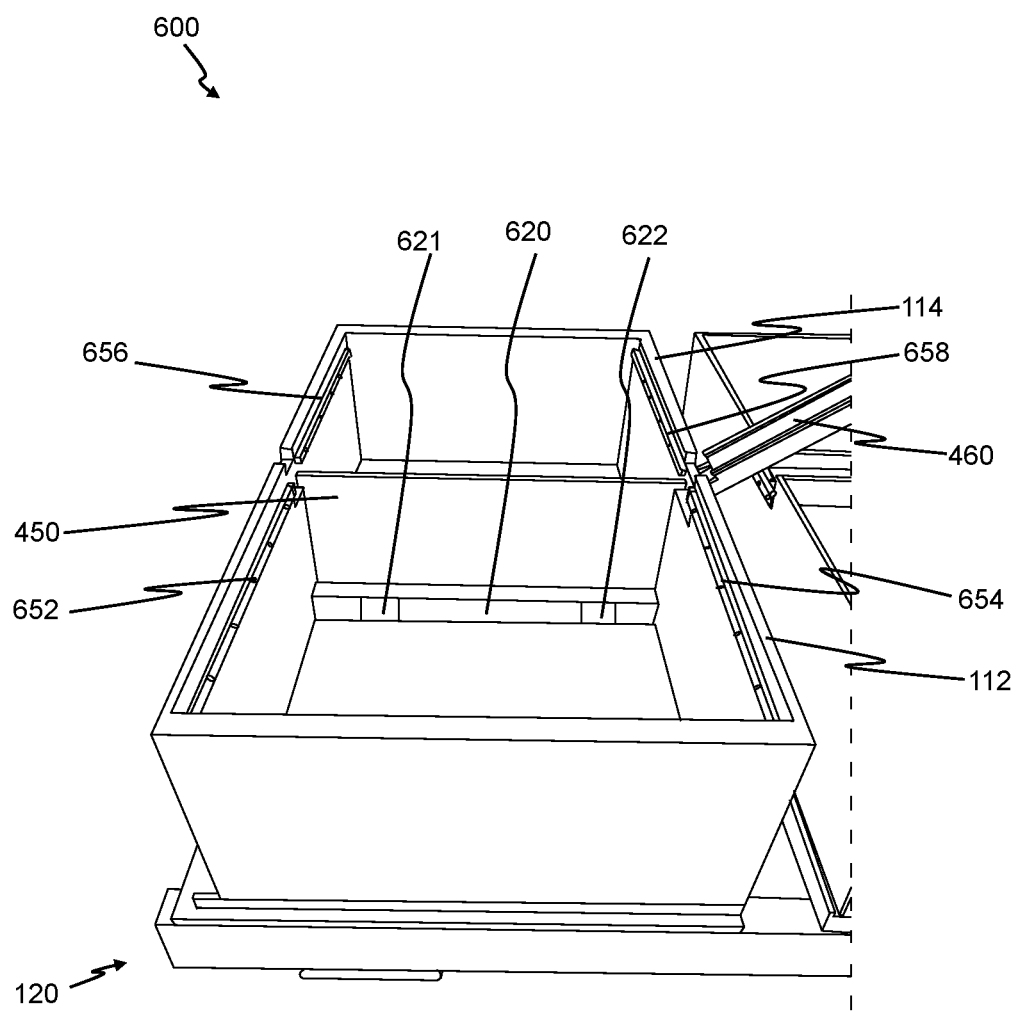
FIG. 6 illustrates a side perspective view depicting the inner details of the beehive system having the removable solid panel brood box divider installed therein.
Figure 7:
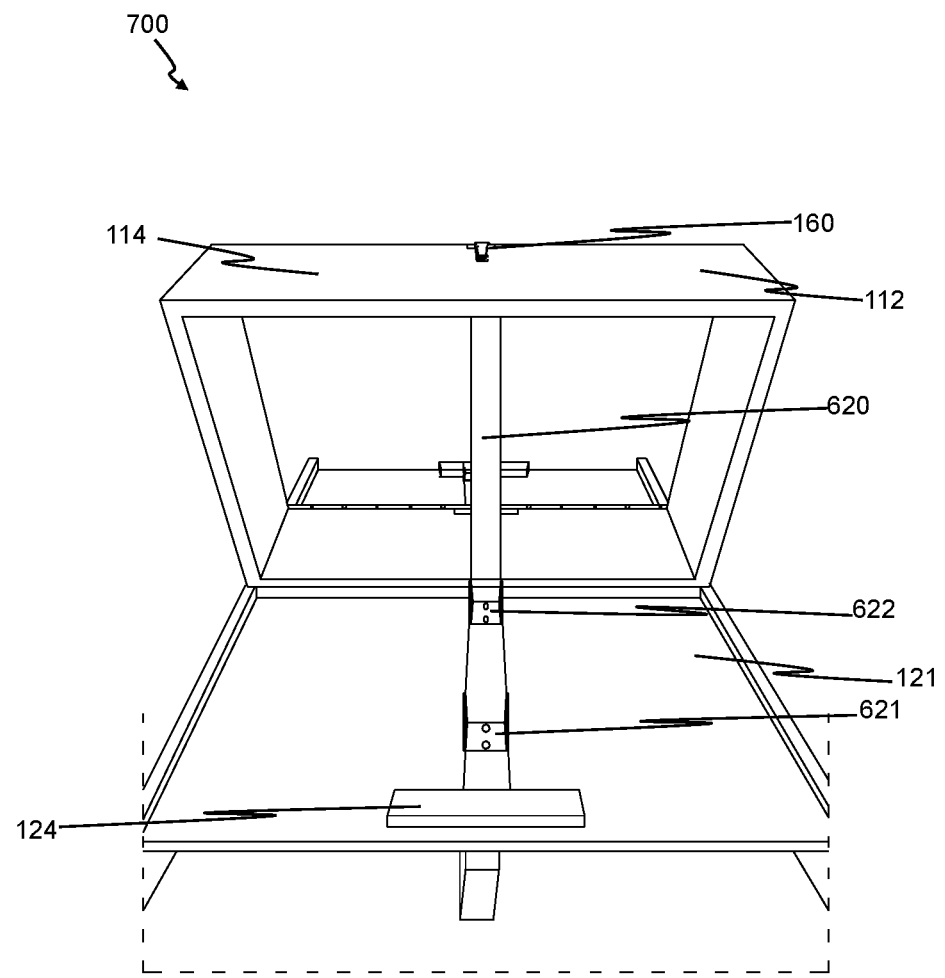
FIG. 7 illustrates a front view of two brood boxes wide by two bee hives deep pallet bottom boards (aka "bottom board") with U-shaped pallet clips.
Figure 8:
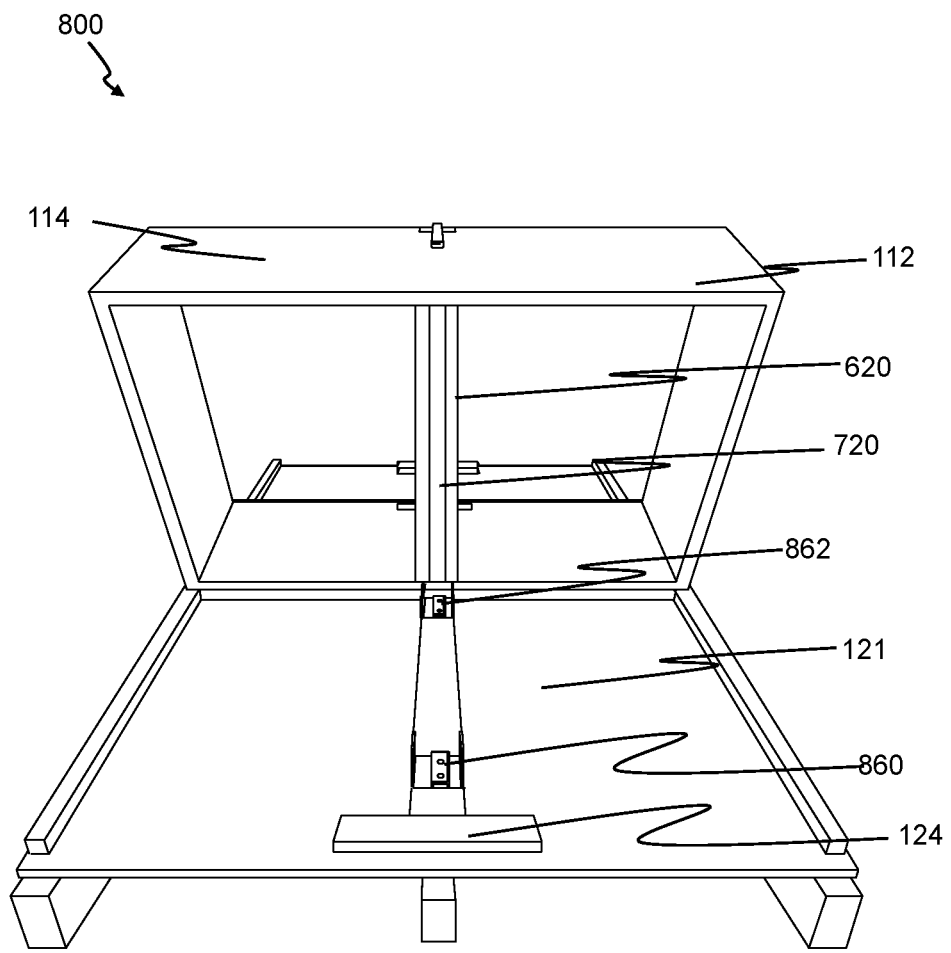
FIG. 8 illustrates a front view of the two brood boxes wide by the two bee hives deep pallet bottom boards (aka "bottom board") with W-shaped pallet clips.

In opening, simultaneous reference is made to FIGS. 1 through 8, in which FIG. 1 illustrates a front perspective view of a beehive system (100), FIG. 2 illustrates a front perspective view of the beehive system (200) depicting an alternative arrangement. FIG. 3 is a top perspective view (300) of the beehive system (100) with a plurality of first type of beehive frames (341, 342) and a plurality of second type of beehive frames (320-339), where a first lid slot assembly (150) is in an open position, FIG. 4 illustrates inner details (400) of the beehive system (100) having a removable solid panel brood box divider (450) installed therein, FIG. 5 illustrates the inner details (500) of the beehive system (100) having a removable queen excluder panel brood box divider (350) installed therein, FIG. 6 illustrates a side perspective view (600) depicting the inner details of the beehive system (100) having the removable solid panel brood box divider (450) installed therein, FIG. 7 illustrates a front view (700) of two brood boxes wide by two bee hives deep pallet bottom boards (aka "bottom board") (121) with U-shaped pallet clips (621, 622), and FIG. 8 illustrates a front view (800) of the two brood boxes wide by the two bee hives deep pallet bottom boards (aka "bottom board") (121) with W-shaped pallet clips (860, 862).

As shown in FIG. 1 to FIG. 8, the beehive system (100, 200) includes a brood box top portion (110), a brood box bottom portion (120), a first brood box (112), a second brood box (114), the bottom board (i.e., bee hives deep pallet bottom board) (121), one or more supporting elements (122-126), an additional bottom board (128), one or more additional supporting elements (131, 133, 135), a first migratory top cover (140), a second migratory top cover (142), the first lid slot assembly (150), a first lid latch assembly (160), a predefined gap (i.e., bee space gap) (170), a third brood box (210), one or more handling means (212, 222), a fourth brood box (220), a frame interior arrangement (312, 314), the plurality of second type of beehive frames (320-339), the plurality of first type of beehive frames (341, 342), the removable queen excluder panel brood box divider (350), a first lid hinge (352), a honeycomb structured layer (421, 431), the removable solid panel brood box divider (450), a plurality of recesses (455), a receiving slot (360, 465), a frame rest (470, 472, 652, 654, 656, 658), a vertical slot (485), a horizontal slot (490), a support (620), the U-shaped pallet clip(s) (621, 622), a groove (720), and the W-shaped pallet clip(s) (860, 862).

In general, the brood box top portion (110) is formed by the first brood box (112), the second brood box (114), the first migratory top cover (140), the second migratory top cover (142), the first lid slot assembly (150), and the first lid latch assembly (160). The brood box bottom portion (120) is formed by the bottom board (121), the one or more supporting elements (122, 124, 126), the additional bottom board (128), and the one or more additional supporting elements (131, 133, 136).

As shown in FIG. 1, the first brood box (112) and the second brood box (114) are arranged next to each-other, share a common wall, with what are functionally their fronts parallel to each other. Alternatively, as shown in FIG. 2, the third brood box (210) and the fourth brood box (220) may be placed above the first brood box (112), and the second brood box (114) respectively. The front-facing and back-facing portions of the first brood box (112) and the second brood box (114) are preferably integrated as a single wall panel of boards respectively, and are typically made of wood. Similarly, as shown in FIG. 2, the front-facing portions and back-facing portions of the third brood box (210) and the fourth brood box (220) are preferably separate wall panels of boards, typically made of wood. Further, a bottom (not shown) of the first brood box (112) and the second brood box (114) may have a plurality of ventilation openings (not shown). Shapes and sizes of independent brood boxes are well known to those in the bee keeping arts, and the modifications shown herein are readily understood by those of skill in the art upon reading this disclosure.

Referring again to FIG. 1, the first lid slot assembly (150) is arranged between the first brood box (112) and the second brood box (114). The first lid slot assembly (150) includes a first lid latch assembly (160), which is preferably a snap fit type latch, but may also be an interlock type latch, pinch latch, belt shaped latch, for example. The first lid latch assembly (160) is adapted to latch the first lid slot assembly (150) to the front facing portion between the first brood box (112) and the second brood box (114). The first brood box (112) is covered by a first migratory top cover (140) and the second brood box (114) is covered by the second migratory top cover (142). The first migratory top cover (140) is removably attachable to the first brood box (112) and the second migratory top cover (142) is removably attachable to the second brood box (114). The first brood box (112) and the second brood box (114) are arranged parallel beside each other, where a bottom side of the first brood box (112) and a bottom side of the second brood box (114) are located over the bottom board (121) in a same plane. The bottom side of the first brood box (112) and the bottom side of the second brood box (114) are located over the bottom board (121) using the one or more supporting elements (122, 124, 126) typically made of wood, plastic, steel or the like. The supporting elements (122, 124) are placed between the bottom board (121) and the bottom side of the first brood box (112) and the supporting elements (124, 126) are place between the bottom board (121) and the bottom side of the second brood box (114).

The supporting element (124) is a common supporting element used between the first brood box (112) and the second brood box (114). The bottom board (121) can be, for example, but not limited to a screened bottom board and a solid bottom board. The bottom board (121) is typically made of wood and is adapted to accommodate the first brood box (112) and the second brood box (114) over it. The bottom board (121) allows fork-lifts to load pallets with the brood boxes onto a vehicle such as a truck or flatbed trailer. A gap between the bottom board (121) and the bottom sides of the first brood box (112) or the second brood box (114) is equal to the height of the one or more supporting elements (122, 124, 126), as is common in the bee-keeping arts.

The bottom board (121) may provide a landing space for bees to assemble in front of the first brood box (112) and the second brood box (114) before entering into the first brood box (112) and the second brood box (114). One or more lower (additional) supporting elements (131, 133, 135) may be used to support the bottom board (121) and a lower bottom board (128) may be placed below the one or more additional supporting elements (131, 133, 135). The lower bottom board (128) and the one or more additional supporting elements (131, 133, 135) may be optional and may avoid the damage to the beehive system (100).

Referring to FIG. 2, the third brood box (210) is positioned over and in vertical alignment with the first brood box (112). The third brood box (210) includes a first handling means (212) to assist a user (beekeeper, for example) to carry the fourth brood box (210). The fourth brood box (220) is positioned over and in vertical alignment with the second brood box (114). The fourth brood box (220) includes a second handling means (222) to assist the user to carry the fourth brood box (220). The first migratory top cover (140) covers the third brood box (210) and the second migratory top cover (142) covers the fourth brood box (220). The shape and size of the first handling means (212) and the second handling means (222) are preferably based on industry standards or alternatively based on user requirements and not a necessity for the invention.

Referring to FIG. 3, a width and a length of the first brood box (112) and the second brood box (114) comprise perpendicular sides adapted to receive the plurality of first type of beehive frames (341, 342) and the plurality of second type of beehive frames (320-339) as visible in the frame interior arrangement (312, 314). As shown in FIGS. 3 and 4, the plurality of first type of beehive frames (341, 342) and at least one of the removable queen excluder panel brood box divider (350) or the removable solid panel brood box divider (450) are located under the first lid slot assembly (150) when the first lid slot assembly (150) is in the closed position. The first lid hinge (352) enables movement of the first lid slot assembly (150) to cover the first brood box (112) and the second brood box (114).

The removable solid panel brood box divider (450) is used between the first brood box (112) and the second brood box (114) when multiple colonies are in an early stage of development, so as to allow a bee colony in the first brood box (112) and the second brood box (114) to develop independently from other bee colonies and allow the user/beekeeper to monitor a queen bee in the first brood box (112) and the second brood box (114) to ensure that the queen bee is laying eggs and the bee colony is healthy. Further, the removable solid panel brood box divider (450) is replaced with the removable queen excluder panel brood box divider (350) to allow the colony in the first brood box (112) and the colony in the second brood box (114) to function as a single colony, upon detecting that the queen bee has died, so as to allow a queenless colony to survive and function as part of an adjacent queen-right colony. The removable queen excluder panel brood box divider (350) may comprise a double screen board, which includes two screens separated by a gap to allow worker bee passage while preventing queen passage, as is known in the beekeeping art.

The removable queen excluder panel brood box divider (350) and the removable solid panel brood box divider (450) are placed between each of the plurality of first type of beehive frames (341, 342). In other words, as shown in FIGS. 3 and 4, the plurality of first type of beehive frames (341, 342) is installed on each side of at least one of the removable queen excluder panel brood box divider (350) or the removable solid panel brood box divider (450). As shown in FIG. 4, the plurality of recesses (455) is provided to support the plurality of first type of beehive frames (341, 342). Each of the plurality of first type of beehive frames (341, 342) has a same length and a same width. Further, a height of the plurality of first type of beehive frames (341, 342) may be 6 and ¼". Alternatively, the height of each of the plurality of first type of beehive frames (341, 342) may be based on user requirements or industry standards.

The plurality of second type of beehive frames (320-329, 330-339) is placed/installed in the first brood box (112) and the second brood box (114), respectively. In an embodiment, the plurality of first type of beehive frames (341, 342) is different from the plurality of second type of beehive frames (320-339). In another embodiment, the plurality of first type of beehive frames (341, 342) is substantially similar to the plurality of second type of beehive frames (320-339). Each beehive frame from the plurality of second type of beehive frames (320-339) is placed at a predefined gap (170) in the first brood box (112) and the second brood box (114).

The predefined gap (140) exists between each individual block/sub-frame (i.e., each beehive frame) of the plurality of second type of beehive frames (320-339). The predefined gap (140) is typically approximately ⅜" between each of the plurality of second type of beehive frames (320-339), which allows the bees in the beehive system (100) to maneuver around the plurality of second type of beehive frames (320-339). Alternatively, the predefined gap (140) may be based on user requirements or industry standards. Alternatively, the predefined gap (170) may be identical to each other. Further, each of the plurality of second type of beehive frames (320-339) has a same length and a same width. Further, a height of each of the plurality of second type of beehive frames (320-339) may be 9⅛". Alternatively, the height of each of the plurality of second type of beehive frames (320-339) may be based on user requirements or industry standards. As shown in FIG. 4, each beehive frame from the plurality of second type of beehive frames (320-339) comprises a honeycomb structured layer (421, 431). The plurality of first type of beehive frames (341, 342) and the plurality of second type of beehive frames (320-339) rest/placed on the frame rest (470, 472, 652, 654, 656, 658), preferably metal frame rest, that provides durability to the plurality of first type of beehive frames (341, 342) and the plurality of second type of beehive frames (320-339).

Referring to FIG. 4, the at least one of the removable queen excluder panel brood box divider (350) or the removable solid panel brood box divider (450) is secured from its top side in the receiving slot (360, 465) located at a bottom surface (460) of the first lid slot assembly (150). The at least one of the removable queen excluder panel brood box divider (350) or the removable solid panel brood box divider (450) is secured from its bottom side in the horizontal slot (490) in the support (620). The support (620) is secured in one or more pallet clips (e.g., U-shaped pallet clip (621, 622) and W-shaped pallet clip (860, 862)) for holding the at least one of the removable queen excluder panel brood box divider (350) or the removable solid panel brood box divider (450) (as shown in FIG. 6-FIG. 8). The support (620) includes the groove (720) that receives one or more W-shaped pallet clips (860, 862). The vertical slot (485) between the first brood box (112) and the second brood box (114) secures the at least one of the removable queen excluder panel brood box divider (350) or the removable solid panel brood box divider (450) from its side.

Referring to FIG. 7 that shows how the support (620), typically made of wood, receives the pallet clips (621, 622) (e.g., U-shaped pallet clips) in the beehive system (100) having two brood boxes (112, 114) wide by two bottom boards (121). Referring to FIG. 8 that shows how the support (620) with the groove (720) receives the pallet clips (860, 862) (e.g., W-shaped pallet clips) in the beehive system (100) having two brood boxes (112, 114) wide by the two bottom boards (121).

Figure 9:
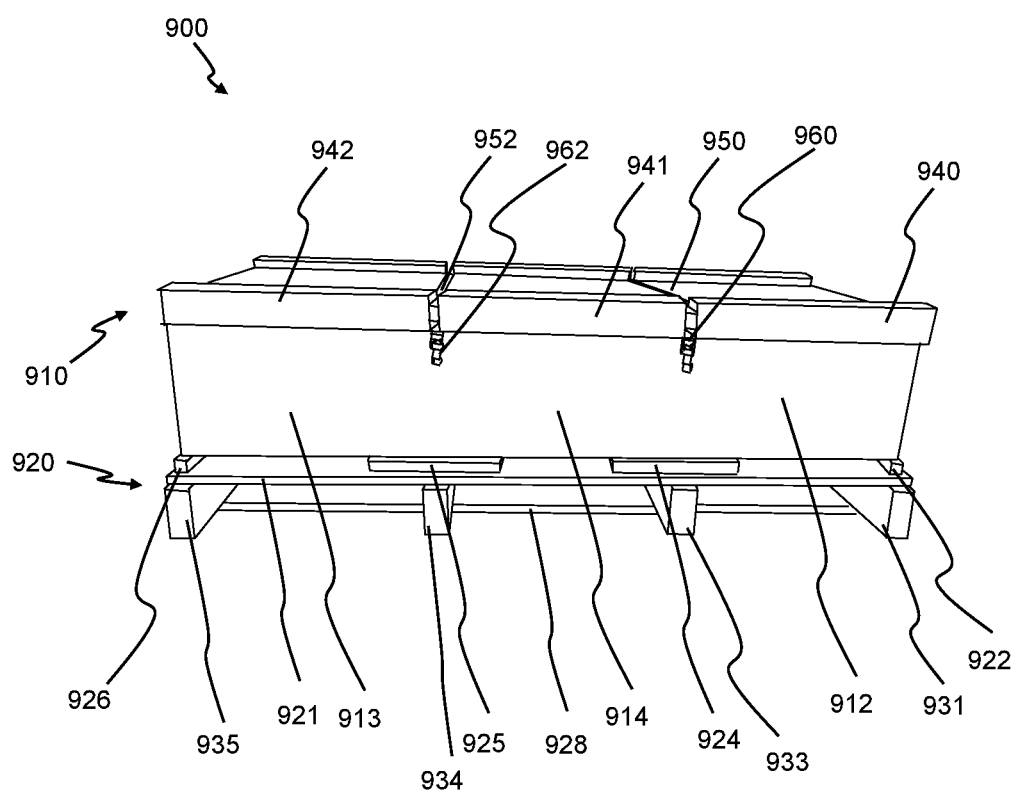
FIG. 9 illustrates a front perspective view of the beehive system depicting an alternative arrangement.
Figure 10:
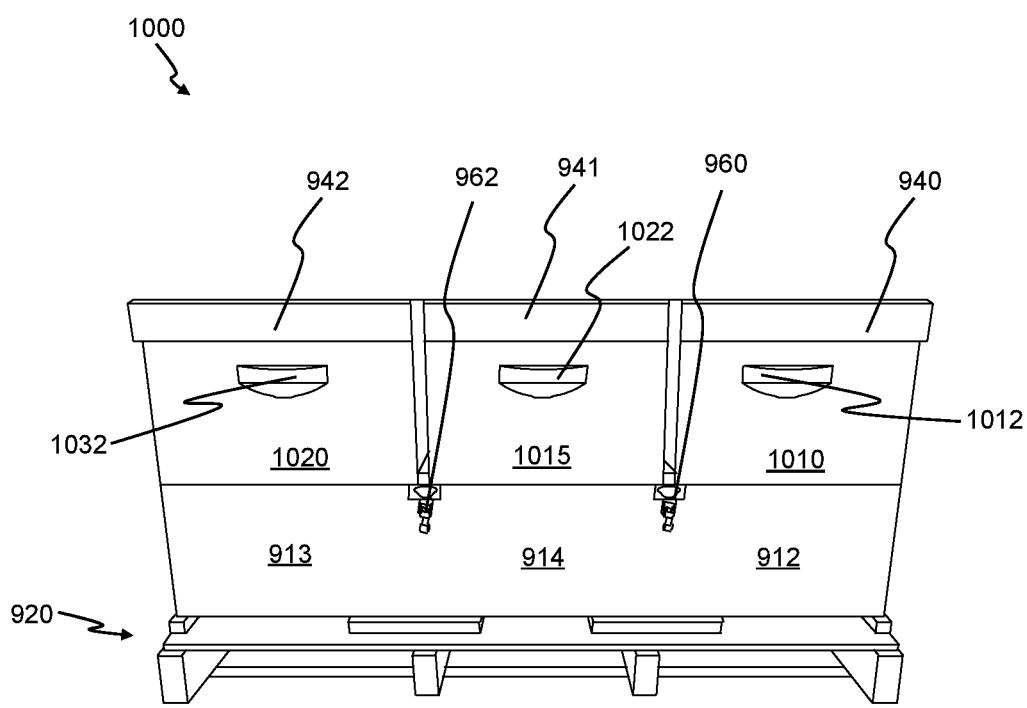
FIG. 10 illustrates a front perspective view of the beehive system depicting an alternative arrangement.
Figure 11:
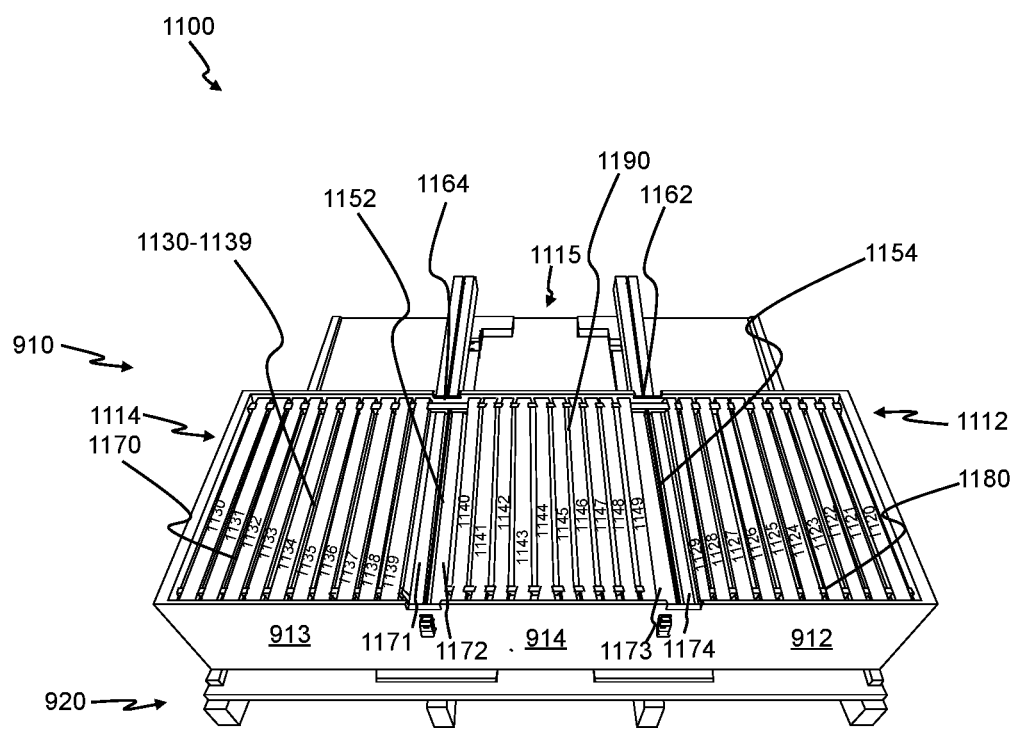
FIG. 11 is a top perspective view of the alternative arrangement of the beehive system depicting the plurality of first type of beehive frames and the plurality of second type of beehive frames.
Figure 12:
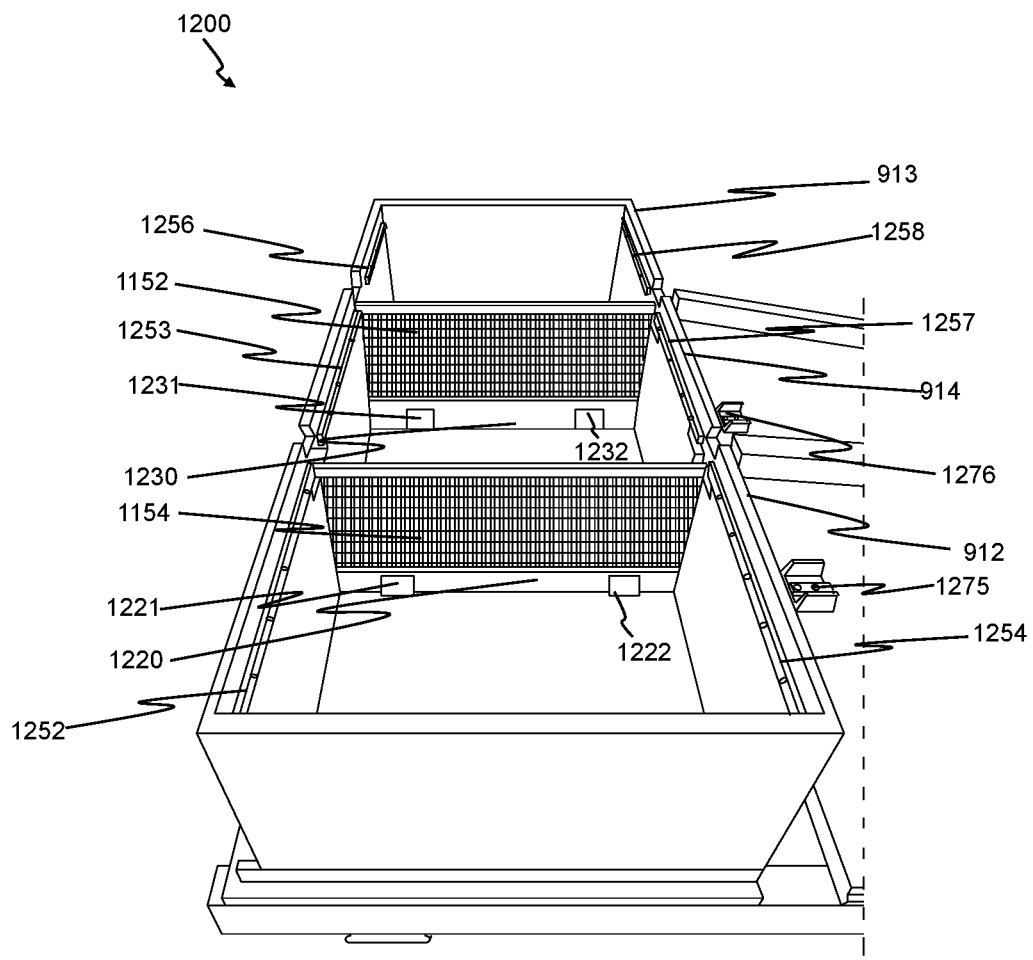
FIG. 12 illustrates a side perspective view depicting the inner details of the beehive system having the removable queen excluder panel brood box divider installed therein.
Figure 13:
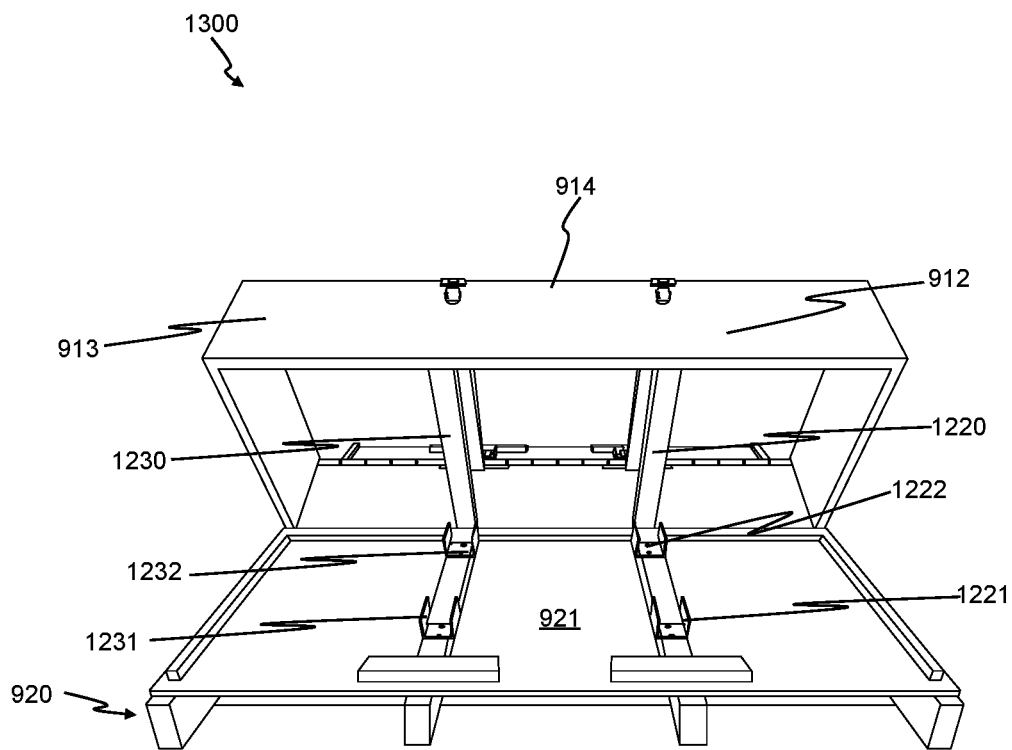
FIG. 13 illustrates a front view of three brood boxes wide by the two bee hives deep pallet bottom boards (aka "bottom board") with the U-shaped pallet clips.
Figure 14:
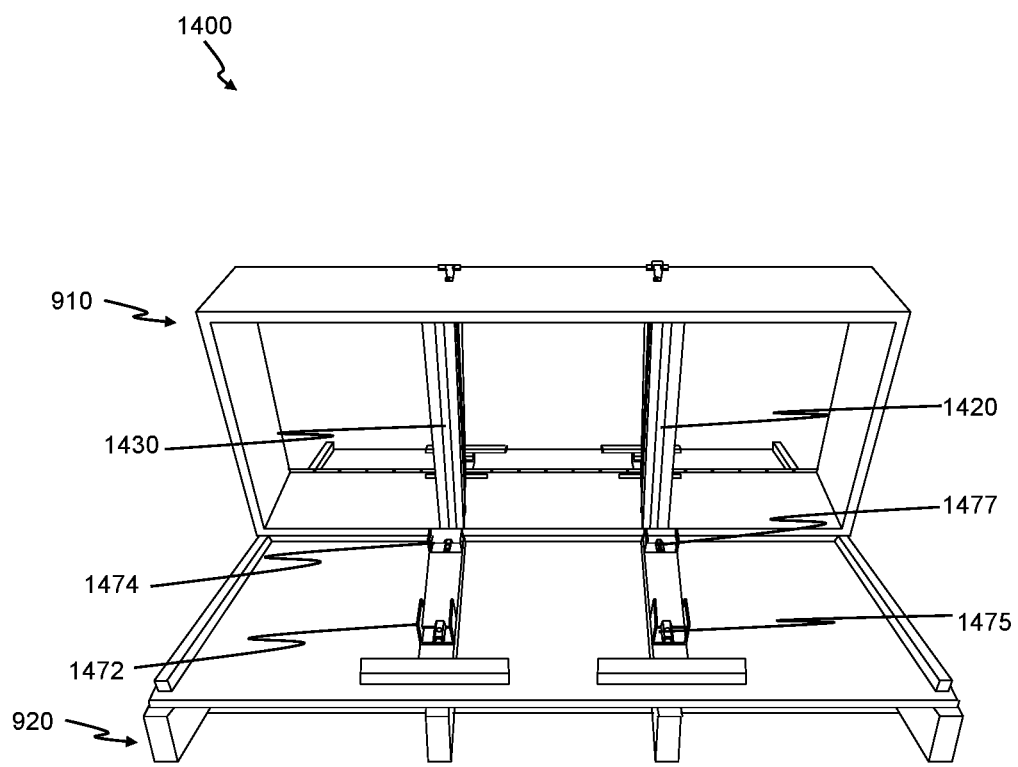
FIG. 14 illustrates a front view of the three brood boxes wide by the two bee hives deep pallet bottom boards (aka "bottom board") with the W-shaped pallet clips.

In an alternative arrangement, simultaneous reference is made to FIGS. 9 through 14, in which FIG. 9 illustrates a front perspective view of the beehive system (900) depicting an alternative arrangement, FIG. 10 illustrates a front perspective view of the beehive system (1000) depicting an alternative arrangement, FIG. 11 is a top perspective view (1100) of the beehive system (900) with the plurality of first type of beehive frames (1171, 1172, 1173, 1174) and the plurality of second type of beehive frames (1120-1129, 1130-1139, 1140-1149) depicting an alternative arrangement, FIG. 12 illustrates a side perspective view (1200) depicting the inner details of the beehive system (900) having the removable queen excluder panel brood box (1152, 1154) divider installed therein, FIG. 13 illustrates a front view (1300) of three brood boxes wide by the two bee hives deep pallet bottom boards (aka "bottom board") (921) with the U-shaped pallet clips (1221, 1222, 1231, 1232), and FIG. 14 illustrates a front view (1400) of the three brood boxes wide by the two bee hives deep pallet bottom boards (aka "bottom board") (921) with the W-shaped pallet clips (1472, 1474, 1475, 1477, 1275, 1276).

As shown in the FIGS. 9-14, the beehive system (900, 1000) includes the brood box top portion (910), the first brood box (912), the second brood box (914), a third brood box (913), the brood box bottom portion (920), the bottom board (i.e., bee hives deep pallet bottom board) (921), one or more supporting elements (922, 924, 925, 926), an additional bottom board (928), one or more additional supporting elements (931, 933, 934, 935), the first migratory top cover (940), the second migratory top cover (941), a third migratory top cover (942), the first lid slot assembly (950), a second lid slot assembly (952), the first lid latch assembly (960), a second lid latch assembly (962), one or more handling means (1012, 1022, 1032), the plurality of second type of beehive frames (1120-1129, 1130-1139, 1140-1149), the removable queen excluder panel brood box divider (1152, 1154), a first lid hinge (1162), a second lid hinge (1164), the plurality of first type of beehive frames (1171, 1172, 1173, 1174), a predefined gap (i.e., bee space gap) (1170, 1172), a receiving slot (not shown, but similar to FIGS. 1-8), a plurality of recesses (not shown, but similar to FIGS. 1-8), the removable solid panel brood box divider (not shown, but similar to FIGS. 1-8), a horizontal slot (not shown, but similar to FIGS. 1-8), a vertical slot (not shown, but similar to FIGS. 1-8), a honeycomb structured layer (not shown, but similar to FIGS. 1-8), the U-shaped pallet clip(s) (1221, 1222, 1231, 1232), a support (1220, 1230), a frame rest (1252, 1253, 1254, 1256, 1257, 1258), a groove (1420, 1430), and the W-shaped pallet clip(s) (1472, 1474, 1475, 1477, 1275, 1276).

In general, the brood box top portion (910) is formed by the first brood box (912), the second brood box (914), the third brood box (913), the first migratory top cover (940), the second migratory top cover (941), the third migratory top cover (942), the first lid slot assembly (950), the second lid slot assembly (952), the first lid latch assembly (960), and the second lid latch assembly (962). The brood box bottom portion (920) is formed by the bottom board (921), the one or more supporting elements (922, 924, 925, 926), the additional bottom board (928), and the one or more additional supporting elements (931, 933, 934, 935).

As shown in FIG. 9 and FIG. 10, the first brood box (912), the second brood box (914) and the third brood box (913) are arranged linearly, with what are functionally their fronts parallel to each other. The fourth brood box (1010), the fifth brood box (1015) and the sixth brood box (1020) may be placed above the first brood box (912), the second brood box (914) and the third brood box (913) respectively. The front-facing and back-facing portions of the first brood box (912), the second brood box (914), and the third brood box (913) are preferably separate wall panel of boards, typically made of wood. Similarly, the front-facing and back-facing portions of the fourth brood box (1010), the fifth brood box (1015), and the sixth brood box (1020) are preferably integrated as a single wall panel of boards, typically made of wood. Shapes and sizes of independent brood boxes are well known to those in the bee keeping arts, and the modifications shown herein are readily understood by those of skill in the art upon reading this disclosure.

The first lid slot assembly (950) is arranged between the first brood box (912) and the second brood box (914). The first lid slot assembly (950) has the first lid latch assembly (960) for latching the first lid slot assembly (950) on the front facing portion between the first brood box (912) and the second brood box (914). Similarly, the second lid slot assembly (952) is arranged between the second brood box (914) and the third brood box (913). The second lid slot assembly (952) includes a second lid latch assembly (962).

The first brood box (912) is covered by the first migratory top cover (940), the second brood box (914) is covered by the second migratory top cover (941) and the third brood box (913) is covered by the third migratory top cover (942). The first migratory top cover (940) is removably attachable to the first brood box (912), the second migratory top cover (941) is removably attachable to the second brood box (914) and the third migratory top cover (942) is removably attachable to the third brood box (913). The first brood box (912), the second brood box (914) and the third brood box (913) are arranged parallel to each other, where the bottom side of the first brood box (912), the bottom side of the second brood box (914) and a bottom side of the third brood box (913) are located over the bottom board (921).

The bottom side of the first brood box (912), the bottom side of the second brood box (914) and the bottom side of the third brood box (913) are located over the bottom board (921) using the one or more supporting elements (922, 924, 925, 926). The supporting elements (922, 924) are placed between the bottom board (921) and the bottom side of the first brood box (912). The supporting elements (924, 925) are placed between the bottom board (921) and the bottom side of the second brood box (914). The supporting elements (925, 926) are placed between the bottom board (921) and the bottom side of the third brood box (913). The supporting elements (924, 925) are common supporting elements used between the first brood box (912) and the second brood box (914) and the second brood box (914) and the third brood box (913) respectively.

A gap between the bottom board (921) and the bottom sides of the first brood box (912) or the second brood box (914) or the third brood box (913) is equal to the height of the one or more supporting elements (922, 924, 925, 926). The bottom board (921) may provide the landing space for bees to assemble in front of the first brood box (912), the second brood box (914) and the third brood box (913) before entering into the first brood box (912), the second brood box (914) and the third brood box (913). The one or more additional supporting elements (931, 933, 934, 935) may be used to hold or support the bottom board (921) and the additional bottom board (928) may be used to support or hold the one or more additional supporting elements (931, 933, 934, 935). The additional bottom board (928) and the one or more additional supporting elements (931, 933, 934, 935) may be optional and may avoid the damage to the beehive systems (900 and 1000).

In an alternate arrangement, referring to FIG. 10, the fourth brood box (1010) is positioned over and in vertical alignment with the first brood box (912). The fourth brood box (1010) is covered by the first migratory top cover (940). The fourth brood box (1010) includes the first handling means (1012) to assist the user to carry the fourth brood box (1010). The fifth brood box (1015) is positioned over and in vertical alignment with the second brood box (914). The fifth brood box (1015) is covered by the second migratory top cover (941). The fifth brood box (1015) includes the second handling means (1022) to assist the user to carry the fifth brood box (1015). The sixth brood box (1020) is positioned over and in vertical alignment with the third brood box (913). The sixth brood box (1020) is covered by the third migratory top cover (942). The sixth brood box (1020) includes the third handling means (1032) to assist the user to carry the sixth brood box (1020). Shape and size of the first handling means (1012), the second handling means (1022), and the third handling means (1032) are preferably based on the industry standards or alternatively based on user requirements and not a necessity for the invention. It may be noted that the number of brood boxes are used based on user requirements, thus is not limited to the arrangements shown in Figures.

The third brood box (913) is used in addition to the two brood boxes (912, 914), where the removable solid panel brood box dividers are used between the first brood box (912) and the second brood box (914) and the second brood box (914) and the third brood box (913), respectively, when multiple colonies are in an early stage of development, so as to allow a bee colony in the first brood box (912), the second brood box (914) and the third brood box (913) to develop independently from other bee colonies and allow the user to monitor the queen bee in the first brood box (912), the second brood box (914) and the third brood box (913) to ensure that the queen bee is laying eggs and the bee colony is healthy. As shown in FIG. 11, the plurality of first type of beehive frames (1171, 1172, 1173, 1174) and at least one of the removable queen excluder panel brood box divider (1152, 1154) or the removable solid panel brood box divider is located under the first lid slot assembly (950) and the second lid slot assembly (952). The first lid hinge (1162) enables movement of the first lid slot assembly (950) to cover the first brood box (912) and the second brood box (914) and the second lid hinge (1164) enables movement of the second lid slot assembly (952) to cover the second brood box (914) and the third brood box (913).

The plurality of first type of beehive frames (1171, 1172, 1173, 1174) is installed on each side of at least one of the removable queen excluder panel brood box divider (1152, 1154) or the removable solid panel brood box divider and is supported by the plurality of recesses. The plurality of second type of beehive frames (1120-1129, 1130-1139, 1140-1149) is placed/installed in the first brood box (912), the second brood box (914) and the third brood box (913). A width and a length of the first brood box (912), the second brood box (914) and the third brood box (913) comprise perpendicular sides adapted to receive the beehive frames. Each beehive frame from the plurality of second type of beehive frames (1120-1129, 1130-1139, 1140-1149) is placed at the predefined gap (1170, 1180, 1190) in the first brood box (912), the second brood box (914), and the third brood box (913). Each beehive frame from the plurality of second type of beehive frames (1120-1129, 1130-1139, 1140-1149) includes the honeycomb structured layer. The plurality of first type of beehive frames (1171, 1172, 1173, 1174) and the plurality of second type of beehive frames (1120-1129, 1130-1139, 1140-1149) rest/placed on the frame rest (1252, 1253, 1254, 1256, 1257, 1258), preferably metal frame rest, that provides durability to the plurality of first type of beehive frames (1171, 1172, 1173, 1174) and the plurality of second type of beehive frames (1120-1129, 1130-1139, 1140-1149).

As shown in FIG. 11 and FIG. 12, the at least one of the removable queen excluder panel brood box divider (1152, 1154) or the removable solid panel brood box divider is secured from its top side in the receiving slot located at the bottom surfaces of the first lid slot assembly (950) and the second lid slot assembly (952) respectively. The at least one of the removable queen excluder panel brood box divider (1152, 1154) or the removable solid panel brood box divider is secured from its bottom side in the horizontal slot in the support (1220, 1230). The support (1220, 1230) is secured in one or more pallet clips (e.g., U-shaped pallet clip (1221, 1222, 1231, 1232) and W-shaped pallet clip (1472, 1474, 1475, 1477, 1275, 1276)) for holding the at least one of the removable queen excluder panel brood box divider (1152, 1154) or the removable solid panel brood box divider. The support (1220, 1230) includes the groove (1420, 1430) that receives the one or more W-shaped pallet clips (1472, 1474, 1475, 1477, 1275, 1276). The vertical slot (not shown) between the first brood box (912) and the second brood box (914) and the second brood box (914) and the third brood box (913) respectively secure the at least one of the removable queen excluder panel brood box divider (1152, 1154) or the removable solid panel brood box divider from its side.

Referring to FIG. 13 that shows how the support (1220, 1230) receives the pallet clips (1221, 1222, 1231, 1232) (e.g., U-shaped pallet clips) in the beehive system (900) having three brood boxes (912, 914, 913) wide by the two bottom boards (921). Referring to FIG. 14 that shows how the support (1220, 1230) with the groove (1420, 1430) receives the pallet clips (1472, 1474, 1475, 1477) (e.g., W-shaped pallet clips) in the beehive system (900) having three brood boxes (912, 914, 913) wide by the two bottom boards (921). It may be noted that although FIG. 13 to FIG. 14 represent the front views, the back views also look similar to FIG. 13 to FIG. 14.

It may be noted that although the present invention shows various elements and arrangements of the beehive system (100, 200, 900, 1000), but it is to be understood that other alternatives are not limited thereon. For example, though not shown, the invention could be modified to accommodate queen excluders that insert via other openings between the brood boxes (112, 114, 210, 220, 912, 914, 1010, 1015, 1020). Further, the labels or names of the elements/components are used only for illustrative purpose and do not limit the scope of the present invention. The shape, size and number of the various elements in the beehive system (100, 200, 900, 1000) do not limit the scope of the present invention.

Advantageously, the beehive system (100, 200, 900, 1000) provides a simple and economical method to increase honey production in a bee colony by providing for a larger bee population within a single colony. The beehive system (100, 200, 900, 1000) also reduces the potential colony losses due to queen issues by allowing multiple queens to coexist within a single hive configuration. Should one of the queens die, the entire hive will remain viable with the remaining queen(s) until such time that the beekeeper replaces the deceased queen. The beehive system (100, 200, 900, 1000) is also designed in such a manner that it is completely compatible with existing standard bee hive components that are readily available. This allows the beekeeper to utilize industry standard bee hive components as well as the bee hive components they currently own in conjunction with the beehive system (100, 200, 900, 1000) to create more productive, healthy bee colonies.

Unless otherwise defined, all technical and scientific terms used herein have the same meaning as commonly understood by one of ordinary skill in the art to which this invention belongs. Although systems, methods and materials similar to or equivalent to those described herein can be used in the practice or testing of equivalent systems and methods, suitable systems and methods and are described above.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. A beehive system, comprising:
    a first brood box;
    a second brood box; and
    a first lid slot assembly arranged between the first brood box and the second brood box, the first lid slot assembly including a cover with a first lid latch assembly and a first lid hinge, the cover configured to secure at least one of a removable queen excluder panel brood box divider or a removable solid panel brood box divider in a receiving slot, the removable queen excluder panel brood box divider configured to allow worker bee passage while preventing queen passage between the first brood box and the second brood box,
        wherein the first brood box and the second brood box are arranged parallel to each other, and
        wherein a bottom side of the first brood box and a bottom side of the second brood box are located over a bottom board in a same plane.

2. The beehive system of claim 1 wherein
    the bottom side of the first brood box and the bottom side of the second brood box are located over the bottom board using at least one supporting element,
    wherein the at least one supporting element is a separate component placed between the bottom board and at least one of the bottom side of the first brood box and the bottom side of the second brood box.

3. The beehive system of claim 1 wherein a first migratory top cover covers the first brood box, and a second migratory top cover covers the second brood box, each migratory top cover being removably attachable to its respective brood box.

4. The beehive system of claim 1 further comprising:
    a third brood box positioned over and in vertical alignment with the first brood box;
    a fourth brood box positioned over and in vertical alignment with the second brood box;
    a first migratory top cover covers the third brood box, and a second migratory top cover covers the fourth brood box;
    the third brood box comprises a first handling means to assist a user to carry the third brood box; and
    the fourth brood box comprises a second handling means to assist the user to carry the fourth brood box; and
    the removable queen excluder panel brood box divider configured to allow worker bee passage while preventing queen passage between the first brood box and the second brood box, and each migratory top cover being removably attachable to its respective brood box.

5. The beehive system of claim 1 wherein the first lid slot assembly comprises the first lid latch assembly for latching the first lid slot assembly between the first brood box and the second brood box, wherein a plurality of first type of beehive frames and at least one of: a removable queen excluder panel brood box divider, or a removable solid panel brood box divider is located under the first lid slot assembly, wherein a first lid hinge enables movement of the first lid slot assembly to cover the first brood box and the second brood box, a migratory top cover being removably attachable to each brood box.

6. The beehive system of claim 5 wherein a plurality of second type of beehive frames is placed in the first brood box and the second brood box, wherein each beehive frame from the plurality of second type of beehive frames is placed at a predefined gap in the first brood box and the second brood box, and each beehive frame from the plurality of second type of beehive frames comprises a honeycomb structured layer; a plurality of recesses supports the plurality of first type of beehive frames; and a frame rest holds and provides durability to the plurality of first type of beehive frames and the plurality of second type of beehive frames.

7. The beehive system of claim 6 wherein the plurality of first type of beehive frames is different from the plurality of second type of beehive frames, or wherein the plurality of first type of beehive frames is substantially similar to the plurality of second type of beehive frames.

8. The beehive system of claim 1 wherein:
the at least one of the removable queen excluder panel brood box divider or the removable solid panel brood box divider is secured in the receiving slot located at a bottom surface of the first lid slot assembly and in a horizontal slot in a support, wherein the support is secured in at least one pallet clip for holding the at least one of the removable queen excluder panel brood box divider or the removable solid panel brood box divider;
the at least one of the removable queen excluder panel brood box divider or the removable solid panel brood box divider is placed between each of the plurality of first type of beehive frames; and
a vertical slot between the first brood box and the second brood box secures the at least one of the removable queen excluder panel brood box divider or the removable solid panel brood box divider.

9. The beehive system of claim 8 wherein
the removable solid panel brood box divider is used between the first brood box and the second brood box when multiple colonies are in an early stage of development, so as to allow a bee colony in the first brood box and the second brood box to develop independently from other bee colonies and allow a user to monitor a queen bee in the first brood box and the second brood box to ensure that the queen bee is laying eggs and the bee colony is healthy; and
the removable solid panel brood box divider is replaced with the removable queen excluder panel brood box divider to allow a first colony in the first brood box and a second colony in the second brood box to function as a single colony or upon detecting that the queen bee has died, so as to allow a queenless colony to survive and function as part of an adjacent queen-right colony.

10. The beehive system of claim 1 wherein the first brood box, the second brood box and a third brood box house a plurality of eggs, larvae and pupae from bees, wherein the beehive system is made of at least one of wood, steel, polymer, aluminum or combination thereof.

11. A beehive system, comprising:
a first brood box;
a second brood box;
a third brood box; and
a first lid slot assembly arranged between the first brood box and the second brood box, the first lid slot assembly including a cover with a first lid latch assembly and a first lid hinge, the cover configured to secure at least one of a removable queen excluder panel brood box divider or a removable solid panel brood box divider in a receiving slot, the removable queen excluder panel brood box divider configured to allow worker bee passage while preventing queen passage between the first brood box and the second brood box;
a second lid slot assembly arranged between the second brood box and the third brood box, the second lid slot assembly including a second cover with a second lid latch assembly and a second lid hinge, the second cover configured to secure at least one of a removable queen excluder panel brood box divider or a removable solid panel brood box divider in a second receiving slot, the removable queen excluder panel brood box divider configured to allow worker bee passage while preventing queen passage between the second brood box and the third brood box,
wherein the first brood box, the second brood box and the third brood box are arranged parallel to each other, and
wherein a bottom side of the first brood box, a bottom side of the second brood box and a bottom side of the third brood box are located over a bottom board in a same plane.

12. The beehive system of claim 11 wherein
the bottom side of the first brood box, the bottom side of the second brood box, and the bottom side of the third brood box are located over the bottom board using at least one supporting element,
wherein the at least one supporting element is a separate component placed between the bottom board and at least one of the bottom side of the first brood box, the bottom side of the second brood box and the bottom side of the third brood box.

13. The beehive system of claim 11 wherein a first migratory top cover covers the first brood box, a second migratory top cover covers the second brood box, and a third migratory top cover covers the third brood box, each migratory top cover being removably attachable to its respective brood box.

14. The beehive system of claim 11 wherein
a fourth brood box positioned over and in vertical alignment with the first brood box;
a fifth brood box positioned over and in vertical alignment with the second brood box;
a sixth brood box positioned over and in vertical alignment with the third brood box;
a first migratory top cover covers the fourth brood box, a second migratory top cover covers the fifth brood box, and a third migratory top cover covers the sixth brood box;
the fourth brood box comprises a first handling means to assist a user to carry the fourth brood box;
the fifth brood box comprises a second handling means to assist the user to carry the fifth brood box; and
the sixth brood box comprises a third handling means to assist the user to carry the sixth brood box, each migratory top cover being removably attachable to its respective brood box.

15. The beehive system of claim 11, wherein the first lid slot assembly comprises the first lid latch assembly for latching the first lid slot assembly between the first brood box and the second brood box, wherein the second lid slot assembly comprises the second lid latch assembly for latching the second lid slot assembly, the removable queen excluder panel brood box divider configured to allow worker bee passage while preventing queen passage between the second brood box and the third brood box, wherein a plurality of first type of beehive frames and the at least one of the removable queen excluder panel brood box divider or the removable solid panel brood box divider is located under the first lid slot assembly and the second lid slot assembly, wherein a first lid hinge and a second lid hinge enable movement of the first lid slot assembly and the second lid slot assembly respectively to cover the first brood box, the second brood box and the third brood box.

16. The beehive system of claim 15, wherein
a plurality of first type of beehive frames installed on each side of the at least one of the removable queen excluder panel brood box divider or the removable solid panel brood box divider;
a plurality of second type of beehive frames placed in the first brood box, the second brood box and the third brood box, wherein each beehive frame from the plurality of second type of beehive frames is placed at a predefined gap in the first brood box, the second brood box, and the third brood box and each beehive frame from the plurality of second type of beehive frames comprises a honeycomb structured layer;
a plurality of recesses for supporting the plurality of first type of beehive frames; and
a frame rest for holding and providing durability to the plurality of first type of beehive frames and the plurality of second type of beehive frames.

17. The beehive system of claim 16 wherein the plurality of first type of beehive frames is different from the plurality of second type of beehive frames, or wherein the plurality of first type of beehive frames is substantially similar to the plurality of second type of beehive frames.

18. The beehive system of claim 15 wherein
the at least one of the removable queen excluder panel brood box divider or the removable solid panel brood box divider secured in a receiving slot located at a bottom surface of the first lid slot assembly and in a horizontal slot in a support, wherein the support is secured in at least one pallet clip for holding the at least one of the removable queen excluder panel brood box divider or the removable solid panel brood box divider;
at least one of the removable queen excluder panel brood box divider or the removable solid panel brood box divider placed between each of the plurality of first type of beehive frames; and
a vertical slot between the first brood box and the second brood box and between the second brood box and the third brood box to secure at least one of the removable queen excluder panel brood box divider or the removable solid panel brood box divider.

19. The beehive system of claim 18 wherein
the removable solid panel brood box divider is used between the first brood box and the second brood box when multiple colonies are in an early stage of development, so as to allow a bee colony in the first brood box and the second brood box to develop independently from other bee colonies and allow a user to monitor a queen bee in the first brood box and the second brood box to ensure that the queen bee is laying eggs and the bee colony is healthy;
the removable solid panel brood box divider is used between the second brood box and the third brood box when multiple colonies are in an early stage of development, so as to allow a bee colony in the second brood box and the third brood box to develop independently from other bee colonies and allow the user to monitor the queen bee in the second brood box and the third brood box to ensure that the queen bee is laying eggs and the bee colony is healthy; and
the removable solid panel brood box divider is replaced with the removable queen excluder panel brood box divider to allow multiple colonies to function as a single colony or upon detecting that the queen bee has died, so as to allow a queenless colony to survive and function as part of an adjacent queen-right colony.

20. The beehive system of claim 11 wherein the first brood box, the second brood box and the third brood box house a plurality of eggs, larvae and pupae from bees, and wherein the beehive system is made of at least one of wood, steel, polymer, aluminum or combination thereof, the beehive system being configured for migratory transport on a pallet.

21. The beehive system of claim 15, wherein at least one of the removable queen excluder panel brood box divider in the first lid slot assembly or the removable queen excluder panel brood box divider in the second lid slot assembly comprises a double screen board configured to allow worker bee passage while preventing queen passage between the respective brood boxes.

22. A beehive system, comprising:
a first brood box;
a second brood box; and
a first lid slot assembly arranged between the first brood box and the second brood box, the first lid slot assembly including a cover with a first lid latch assembly and a first lid hinge, the cover configured to secure at least one of a removable queen excluder panel brood box divider or a removable solid panel brood box divider in a receiving slot, the removable queen excluder panel brood box divider configured to allow worker bee passage while preventing queen passage between the first brood box and the second brood box,
wherein the first brood box and the second brood box are arranged parallel to each other,
wherein a bottom side of the first brood box and a bottom side of the second brood box are located over a bottom board in a same plane;
wherein the first lid slot assembly comprises the first lid latch assembly for latching the first lid slot assembly between the first brood box and the second brood box, wherein a plurality of first type of beehive frames and at least one of: a removable queen excluder panel brood box divider, or a removable solid panel brood box divider is located under the first lid slot assembly, wherein a first lid hinge enables movement of the first lid slot assembly to cover the first brood box and the second brood box, a migratory top cover being removably attachable to each brood box; and
wherein the removable queen excluder panel brood box divider comprises a double screen board configured to allow worker bee passage while preventing queen passage between the first brood box and the second brood box.

* * * * *